United States Patent
Yamaguchi et al.

(10) Patent No.: US 6,524,993 B2
(45) Date of Patent: Feb. 25, 2003

(54) HYDROGENATION CATALYST FOR AROMATIC HYDROCARBONS CONTAINED IN HYDROCARBON OILS

(75) Inventors: Toshio Yamaguchi, Ichikawa (JP); Yuki Kanai, Ichikawa (JP); Hideharu Yokozuka, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 10/139,796

(22) Filed: May 3, 2002

(65) Prior Publication Data

US 2003/0004057 A1 Jan. 2, 2003

(30) Foreign Application Priority Data

May 29, 2001 (JP) ........................... 2001-160904
Dec. 27, 2001 (JP) ........................... 2001-396375

(51) Int. Cl.[7] ................ B01J 23/40; B01J 23/42; B01J 23/58; B01J 23/56; B01J 21/08
(52) U.S. Cl. ............... 502/328; 502/327; 502/332; 502/333; 502/334; 502/339; 502/340; 502/407; 502/439; 502/252
(58) Field of Search ............... 502/327, 328, 502/332, 333, 334, 339, 340, 407, 439, 252; 501/123, 133, 153

(56) References Cited

U.S. PATENT DOCUMENTS

| | | | | | |
|---|---|---|---|---|---|
| 4,920,089 A | * | 4/1990 | Van Beek et al. | ......... | 502/335 |
| 5,188,996 A | * | 2/1993 | Huang et al. | ......... | 502/37 |
| 5,221,656 A | * | 6/1993 | Clark et al. | ......... | 502/315 |
| 5,358,633 A | * | 10/1994 | Dai et al. | ......... | 208/216 R |
| 5,389,595 A | * | 2/1995 | Simpson et al. | ......... | 502/315 |
| 5,403,469 A | | 4/1995 | Vauk et al. | | |
| 5,435,908 A | * | 7/1995 | Nelson et al. | ......... | 208/216 PP |
| 5,444,033 A | * | 8/1995 | Usui et al. | ......... | 502/314 |
| 5,545,602 A | * | 8/1996 | Nelson et al. | ......... | 502/314 |
| 5,616,530 A | * | 4/1997 | Sherwood, Jr. et al. | ......... | 502/210 |
| 5,686,375 A | | 11/1997 | Iyer et al. | | |
| 5,773,657 A | * | 6/1998 | Rutter et al. | ......... | 564/450 |
| 5,827,421 A | * | 10/1998 | Sherwood, Jr. | ......... | 208/112 |
| 5,928,499 A | * | 7/1999 | Sherwood, Jr. et al. | ......... | 208/216 PP |

FOREIGN PATENT DOCUMENTS

| | | |
|---|---|---|
| JP | 03-202152 | 9/1991 |
| JP | 08-283746 | 10/1996 |
| JP | 2000-197821 | 7/2000 |
| JP | 2001-003064 | 1/2001 |
| JP | 2001-205083 | 7/2001 |

* cited by examiner

Primary Examiner—Stanley S. Silverman
Assistant Examiner—Cam N. Nguyen
(74) Attorney, Agent, or Firm—Katten Muchin Zavis Rosenman

(57) ABSTRACT

A hydrogenation catalyst for hydrocarbon oils containing aromatic hydrocarbons is provided. The catalyst has a silica-magnesia oxide carrier with a magnesia content within a range from 25 to 50 weight percent calculated in terms of the metal oxide, to which a noble metal selected from among the group VIII metals of the periodic table is added as the active component. In addition, the pore characteristics of the catalyst are such that the volume of pores with a pore size of at least 4 nm as measured by a mercury porosimetry method is within the range from 0.3 to 0.6 ml/g, the volume of pores with a pore size of at least 200 nm as measured by a mercury porosimetry method is no more than 0.05 ml/g, the volume of pores with a pore size from 0.7 to 2 nm as measured by nitrogen adsorption-t-plot method is within the range from 0.2 to 0.3 ml/g, and the volume of pores with a pore size from 2 to 4 nm as measured by nitrogen adsorption-DH method is within the range from 0.15 to 0.2 ml/g.

5 Claims, No Drawings

HYDROGENATION CATALYST FOR AROMATIC HYDROCARBONS CONTAINED IN HYDROCARBON OILS

TECHNICAL FIELD TO WHICH THE INVENTION BELONGS

The present invention relates to a hydrogenation catalyst for aromatic hydrocarbons contained in hydrocarbon oils, and relates particularly to a hydrogenation catalyst for aromatic hydrocarbons contained in hydrocarbon oils which has a low hydrocracking ratio, high resistance to poisoning by sulfur hydrocarbons and the like, and high hydrogenation activity.

BACKGROUND OF THE INVENTION

The light gas oil used for fuel in diesel engines is prepared as a blend of mainly a light gas oil obtained by performing hydrodesulfurization and denitrogentation processing on a straight run light gas oil fraction having a specific boiling point range obtained by atmospheric distillation of crude oil, and a light gas oil fraction obtained by vacuum distillation.

However, because the volume of the light gas oil fraction in the crude oil is limited, and crude oil becomes heavier over time, the straight run light gas oil fraction obtained by atmospheric distillation tends to reduce in volume. Furthermore, because the demand for light gas oil is increasing in accordance with an increase in the production of diesel engines, a shortage in the supply of light gas oil is anticipated in the near future.

As a result, measures such as adding a cracked or hydrogenated and desulfurized heavy gas oil to the light gas oil fraction, or increasing the production of blend oils which can be added to straight run light gas oil fractions are being considered.

In the case of blend oils which can be added to a straight run light gas oil fraction, light cycle oil having a specific boiling point range obtained from a fluid catalytic cracker is drawing considerable attention as a new blend oil for light gas oil.

However, because the light cycle oil contains a large amount of aromatic hydrocarbons, adding the light cycle oil with these characteristics directly to the straight run light gas oil fraction causes the cetane index of the thus obtained light gas oil to be lowered substantially.

Furthermore, in terms of the standards for aromatic hydrocarbon content within light gas oil fuel, it is anticipated that, in the future, a further reduction of the amount of aromatic hydrocarbons included in light cycle oil to below current levels will be required by law. This is because air pollutants such as particulates in the exhaust gas of diesel engines which contains aromatic hydrocarbons, and specifically the particulate matter which occurs due to the incomplete combustion of a portion of the aromatic hydrocarbons, cause environmental problems. Strict regulations are already in place in Sweden and in California, USA regarding the content of aromatic hydrocarbons in light gas oil.

In order to use the light cycle oil as a blend oil, it is desirable that the aromatic hydrocarbon content be reduced by performing catalytic hydrogenation on the light cycle oil. The sulfur compound content of light cycle oil is low compared with straight run light gas oil fractions, but the hydrogen sulfide produced during hydrogenation of the sulfur compound in there oils may cause a deterioration in activity by inhibiting the hydrogenation of the aromatic hydrocarbons and poisoning active sites of the hydroprocessing catalyst. Consequently, a hydrogenation catalyst for light cycle oil must have high hydrogenation activity and sulfur resistance with respect to aromatic hydrocarbons, and also have desulfurization capabilities.

Among hydrogenation catalysts, catalysts wherein a Group VIII metal is supported by a carrier such as alumina generally have high hydrogenation activity and are effective catalysts, but they suffer in that they deactivate early by being poisoned by the sulfur compounds and the like in the hydrocarbon oils. In order to overcome this problem, an attempt to perform hydrogenation using a catalyst containing zeolite in the carrier is described in Japanese Patent Publication No. Toku Kai Sho 64-66292, and Japanese Patent Publication No. Toku Hyo Hei 8-509999. However, although zeolite is a catalyst with high hydrocracking activity, in hydroprocessing, a hydrocracking occurs at the same time. Because the liquid yield of the light gas oil fraction decreases if a hydrocracking occurs during the hydroprocessing of light cycle oil, it is necessary to suppress hydrocracking activity as much as possible. In addition, the catalyst is poisoned by the high concentration of sulfur compounds and the like contained in the crude oil, and the hydrogenation activity with respect to the aromatic hydrocarbons remains unsatisfactory.

Furthermore, an attempt to perform hydroprocessing using a catalyst comprising a crystalline clay mineral having silicon and magnesium as its main components is disclosed in Japanese Patent Publication No. Toku Kai Hei 8-283746. However, while this method did have the effect of suppressing hydrocracking and raising the yield of the oil product, the hydrogenation activity with respect to the aromatic hydrocarbons remains unsatisfactory.

Generally, catalysts are formed with either comparatively large pores of greater than several dozen nm, or conversely with small pores of less than several dozen nm, and/or with a combination of comparatively large pores of greater than several dozen nm and small pores of less than several dozen nm. The balance of these pore capacities has a large influence on the targeted hydrogenation activity.

The pore characteristics are measured using a mercury porosimetry method for sizes ranging from 4 to 46800 nm, a nitrogen adsorption-DH method for sizes ranging from 2 to 200 nm, and a nitrogen adsorption-t-plot method for sizes ranging from 0.7 to 2 nm. The nitrogen adsorption-DH method and the nitrogen adsorption-t-plot-method are analysis methods based on adsorption isotherms obtained by nitrogen adsorption measurements, and the term "measurement" in the present specification includes obtaining physical properties by means of this type of analysis.

The pore characteristics of the catalyst, for example, the total volume of pores sized from 0.7 to 2 nm contained in 1 g of catalyst is referred to as "the 0.7 to 2 nm pore volume" and is expressed in units of ml/g.

SUMMARY OF THE INVENTION

An object of the present invention is to provide a catalyst which resolves the problems described above associated with conventional catalysts, which is suitable for hydrogenation of hydrocarbon oils containing sulfur compounds and the like, and particularly light gas oil fractions, to reduce the aromatic hydrocarbon content, and which has high resistance to sulfur compounds, high hydrogenation activity, and moreover produces an oil product with a high liquid yield.

DETAILED DESCRIPTION OF THE PREFERRED EMBODIMENTS

A hydrogenation catalyst of the present invention is a hydrogenation catalyst for hydrocarbon oils containing aromatic hydrocarbons, wherein the catalyst comprises a carrier and an active metal, and the pore characteristics of the catalyst are such that the volume of pores with a pore size of at least 4 nm as measured by a mercury porosimetry method is within a range from 0.3 to 0.6 ml/g, the volume of pores with a pore size of at least 200 nm is no more than 0.05 ml/g, the volume of pores with a pore size from 0.7 to 2 nm as measured by a nitrogen adsorption-t-plot method is within a range from 0.2 to 0.3 ml/g, and the volume of pores with a pore size from 2 to 4 nm as measured by a nitrogen adsorption-DH method is within a range from 0.15 to 0.2 ml/g.

Preferably the hydrocarbon oil contains 80 weight percent or more of a fraction with a boiling point of 170 to 390° C.

Preferably the hydrogenation catalyst for hydrocarbon oils containing aromatic hydrocarbons comprises a carrier and an active metal, wherein the carrier is composed of silica-magnesia, the active metal is a noble metal selected from the group VIII of the periodic table, and the magnesia content of the silica-magnesia is within a range from 25 to 50 weight percent, calculated in terms of the metal oxide.

Preferably the proportion of the noble metal selected from the group VIII of the periodic table is within a range from 0.1 to 2 weight percent, calculated in terms of the metal.

In the hydrogenation catalyst for hydrocarbon oils containing aromatic hydrocarbons, preferably the catalyst comprises a carrier and an active metal, and the effective pore size distribution of the catalyst is composed of pore sizes within a range from 4 to 200 nm, and pore sizes within a range from 0.7 to 4 nm, wherein the volume of pores with a pore size in the range from 4 to 200 nm is 0.3 to 0.6 ml/g, and the volume of pores with a pore size in the range from 0.7 to 4 nm is 0.35 to 0.5 ml/g.

The inventors of the present invention, as a result of investigating inorganic oxides which form the substrate of a catalyst, discovered a silica-magnesia composition for use as a carrier material, and investigated the performance of a catalyst formed by the conventional process of supporting a noble metal from the group VIII of the periodic table by this silica-magnesia composition. In addition, the inventors discovered that in terms of the composition ratio of the silica-magnesia compound, a preferred specific range exists which is suitable for lowering the amount of aromatic hydrocarbons in the light gas oil fraction by hydrogenation and is satisfactorily resistant to sulfur hydrocarbons and the like, and also discovered that a suitable range exists with regard to the amount of active metal, and proposed these findings in Japanese Patent Application No. Toku Gan Hei 10-356347. In addition, the inventors of the present invention developed the present invention as a result of conducting intensive research into lowering the amount of aromatic hydrocarbons. Moreover, the silica-magnesia composition utilizes an amorphous material.

In other words, the present invention provides a hydrogenation catalyst for the aromatic hydrocarbons included in hydrocarbon oils. The catalyst has a silica-magnesia composition as the carrier, and comprises a silica-magnesia oxide carrier with a magnesia content within a range from 25 to 50 weight percent calculated in terms of the metal oxide, to which a noble metal selected from among the group VIII metals of the periodic table has been added as the active component. In addition, the pore characteristics of the catalyst are such that the volume of pores with a pore size of at least 4 nm as measured by a mercury porosimetry method is within the range from 0.3 to 0.6 ml/g, the volume of pores with a pore size of at least 200 nm is no more than 0.05 ml/g, the volume of pores with a pore size from 0.7 to 2 nm as measured by nitrogen adsorption-t-plot method is within the range from 0.2 to 0.3 ml/g, and the volume of pores with a pore size from 2 to 4 nm as measured by nitrogen adsorption-DH method is within the range from 0.15 to 0.2 m/g.

It is preferable that the hydrocarbon oil contains a fraction with a boiling point of 170 to 390° C. by an amount of 80 weight percent or more.

It is preferable that the hydrogenation catalyst for hydrocarbon oils containing aromatic hydrocarbons comprises a carrier and an active metal, wherein the carrier is formed from silica-magnesia, the active metal is a noble metal selected from the group VIII of the periodic table, and the magnesia content of the silica-magnesia is within a range from 25 to 50 weight percent, calculated in terms of the metal oxide. Moreover, the silica-magnesia oxide carrier is produced using a silica-magnesia hydrate gel as a basic raw material.

It is preferable that the proportion of the noble metal selected from the group VIII of the periodic table is within a range from 0.1 to 2 weight percent, calculated in terms of the metal.

A catalyst of the p resent invention is prepared by adding a salt solution of the noble metal selected from the group VIII of the periodic table to the carrier comprising a silica-magnesia hydrate gel and/or silica-magnesia oxide carrier, using either a co-mixing method or an impregnation method, and then following drying, performing a calcination. The silica-magnesia hydrate gel becomes silica-magnesia oxide carrier through the calcination.

Specifically, the salt solution of the noble metal selected from the group VIII of the periodic table is added to the silica-magnesia hydrate gel which has a magnesia content, calculated in terms of the metal oxide, of between 25 and 50 weight percent, and the mixture is then kneaded and extruded, and after drying, is calcined (co-mixing method). Alternatively, a silica-magnesia oxide carrier obtained by kneading and extruding the silica-magnesia hydrate gel with a magnesia content, calculated in terms of the metal oxide, of between 25 and 50 weight percent, drying and subsequent calcination is impregnated with a salt solution of the noble metal selected from the group VIII of the periodic table, and then after drying, is subjected to calcination (impregnation method).

Common hydrolysis methods for manufacturing the silica-magnesia hydrate gel with a magnesia content, calculated in terms of the metal oxide, of between 25 and 50 weight percent include a coprecipitation method, a deposition method, and a sol-gel process, although the coprecipitation method is preferred. For example, hydrolysis is performed using a method wherein a sodium silicate aqueous solution, and a magnesium chloride aqueous solution with an amount of magnesium, calculated in terms of the oxide MgO, within a range from 25 to 50 weight percent, are added dropwise concurrently or approximately concurrently into a reaction vessel at a hydrolysis temperature within a range from 40° C. to 60° C., and the thus produced silica-magnesia hydrate slurry is then filtered, washed, and filtered again to obtain a silica-magnesia hydrate gel.

In the present invention, the reason the magnesia content in the silica-magnesia oxide carrier, calculated in terms of the metal oxide, is limited to a value within the range from 25 to 50 weight percent is that outside this range, the hydrogenation catalyst does not function sufficiently well to fulfill the object of the present invention, because the amount of solid acid in the silica-magnesia reduces and/or the amount of solid base increases.

Furthermore, the reason the reaction temperature during hydrolysis is set to a value within the range from 40° C. to 60° C. is that outside this temperature range, the requirements for the pore characteristics for the hydrogenation catalyst of the present invention cannot be satisfied.

Examples of the silica raw material which can be used in the manufacture of the aforementioned silica-magnesia hydrate gel include water soluble salts such as a No. 1 sodium silicate solution, a No. 2 sodium silicate solution and a No. 3 sodium silicate solution. Furthermore, water soluble salts such as magnesium chloride, magnesium sulfate, magnesium nitrate and magnesium acetate can be used as the magnesia raw material.

Next, a plastic substance obtained by adding the salt solution of the noble metal selected from the group VIII of the periodic table to the silica-magnesia hydrate gel so that the metal component, calculated in terms of the metal, is from 0.1 to 2 weight percent and subsequent kneading, or a plastic substance obtained by kneading the aforementioned silica-magnesia hydrate gel, is extruded into the desired shape, and after drying, is calcined.

The shape of the extruded product may be any desired shape such as cylindrical, two leaf, four leaf, or spherical.

Provided the extruded object is dried evenly, drying should not present any particular problems, and for reasons of efficiency and simplicity, the extruded object should be dried at a temperature within a range from 80° C. to 120° C. Furthermore during calcination, because changes may occur such as an agglomeration or a phase change of the active component, the calcination temperature should normally be between 350° C. and 600° C., and preferably between 400° C. and 500° C. If the calcination temperature is below 350° C. an oxide state is not attained, and if the calcination temperature exceeds 600° C., the specific surface area decreases markedly.

In the present invention, the active component or the active metal is selected from metals such as ruthenium, rhodium, palladium or platinum from the group VIII of the periodic table, and a combination of palladium and platinum is especially favorable.

The reason the amount of the active component added, or the amount of the active metal supported is within the range, calculated in terms of the metal, from 0.1 to 2 weight percent relative to the weight of the catalyst is because an amount of less than 0.1 weight percent is too low for the effects caused by the active metal to manifest, whereas an amount exceeding 2 weight percent offers no further improvement in catalytic activity.

The metal salt of the noble metal used in the present invention may be any salt provided that it is a water soluble salt, and suitable examples include a nitrate, a chloride, an acetate or an ammine complex.

Examples of support methods include ion exchange methods, impregnation methods, gas phase methods and co-mixing methods, although the impregnation method and/or the co-mixing method, which are the most representative conventional catalyst preparation methods, are the most convenient. Furthermore, after being supported on the carrier, drying and calcination are then performed to fix the active metal component to the metal oxide carrier.

The pore characteristics of the hydrogenation catalyst obtained in this manner are preferably such that the volume of pores with a pore size of at least 4 nm as measured by the mercury porosimetry method is within a range from 0.3 to 0.6 ml/g, the volume of pores with a pore size of at least 200 nm is up to 0.05 ml/g, the volume of pores with a pore size from 0.7 to 2 nm as measured by the nitrogen adsorption-t-plot method is within a range from 0.2 to 0.3 ml/g, and the volume of pores with a pore size from 2 to 4 nm as measured by the nitrogen adsorption-DH method is within a range from 0.15 to 0.2 ml/g. The nitrogen adsorption-t-plot method is suitable for measuring the range between 0.7 to 2 nm. Furthermore, the nitrogen adsorption-DH method is capable of measuring pore sizes from 2 to 200 nm, although in this application this is limited to pore sizes from 2 to 4 nm. Furthermore, it is preferable that the specific surface area measured using the nitrogen adsorption-BET method is within a range from 350 to 460 $m^2/g$.

The volume of pores with a pore size of at least 4 nm as measured by the mercury porosimetry method is kept within the range from 0.3 to 0.6 ml/g, because at less than 0.3 ml/g, the resistance to diffusion of the hydrocarbon oil (reaction material) through the pores of the catalyst is large, and it becomes difficult for the hydrocarbon oil (reaction material) to penetrate to the inside of the pores, and consequently the dearomatizing rate, the desulfurization rate and the denitrogentation rate deteriorate. Conversely, it is also preferable not to exceed 0.6 ml/g, because in addition to the catalyst losing its usefulness as an industrial catalyst due to a deterioration in the crushing strength of the catalyst, the stability of the catalytic activity also deteriorates, and the catalyst deactivates prematurely.

Furthermore, the volume of pores with a pore size of at least 200 nm as measured by the mercury porosimetry method is restricted to no more than 0.05 ml/g because at volumes exceeding 0.05 ml/g, in addition to the catalyst losing its usefulness as an industrial catalyst due to a deterioration in the crushing strength of the catalyst, the stability of the catalytic activity deteriorates, and the catalyst deactivates prematurely, which is undesirable.

In addition, the volume of pores with a pore size in the range from 0.7 to 2 nm as measured by the nitrogen adsorption-t-plot method are kept within the range from 0.2 to 0.3 ml/g for the following reasons. Namely, if the volume of pores with a pore size in the range from 0.7 to 2 nm as measured by the nitrogen adsorption-t-plot method is less than 0.2 ml/g, the supported active metal agglomerates more easily, the dispersability of the active metal particles deteriorates, and the dearomatizing rate, the desulfurization rate and the denitrogentation rate fall. Conversely, if the volume of pores with a pore size from 0.7 to 2 nm is larger than 0.3 ml/g, a hydrocracking is more likely to occur, coke deposits form inside the pores, and the catalyst deactivates prematurely.

Furthermore, the volume of pores with a pore size in the range from 2 to 4 nm as measured by the nitrogen adsorption-DH method is kept within the range from 0.15 to 0.2 ml/g in order to achieve a balance between the volume of pores with a pore size in the range from 0.7 to 2 nm and the volume of pores with a pore size in the range from 4 to 200 nm which is favorable for hydrogenation activity. In other words, it is clear from the volume of pores with a pore size between 0.7 and 4 nm as measured by the nitrogen adsorption-t-plot method and the nitrogen adsorption-DH method, and the volumes of pores with a pore size of at least 4 nm and at least 200 nm as measured by the mercury porosimetry method, that there is a depression in the pore distribution within the range from 2 to 4 nm.

It is preferable that the hydrocarbon oil contains 80 weight percent or more of a fraction with a boiling point of 170 to 390° C. Light gas oil, kerosene, and jet fuel are examples of hydrocarbon oils that fall within this range.

The crushing strength of an industrial catalyst carrier varies according to the shape of the catalyst, but generally, a value of at least 1.0 kg/mm is required for a 1.5 mm cylindrical catalyst.

The specific surface area as measured by the nitrogen adsorption-BET method is set within the range from 350 to 460 m²/g because if the specific surface area is either too small or too large, the catalytic hydrogenation does not proceed efficiently.

It is thought that the catalyst of the present invention has high hydrogenation activity for aromatic hydrocarbons contained in hydrocarbon oils and yet is highly resistant to poisoning by sulfur hydrocarbons and the like because the targeted reaction proceeds very efficiently due to the specific pore structure and high specific surface area of the catalyst.

In the pore characteristics of the present invention, the volume of pores with a pore size from 0.7 to 2 nm is calculated by the nitrogen adsorption-t-plot method (Coloid Interface Sci., 21, 405 (1996)), the volume of pores with a pore size from 2 to 4 nm is calculated by the nitrogen adsorption-DH method (Kelvin Equation), and the specific surface area is calculated by the nitrogen adsorption-BET method. In addition, the aromatic hydrocarbons in the oil processed to evaluate the performance of the catalyst is determined using a High Performance Liquid Chromatograph (manufactured by Shimazu Corporation), the sulfur content is determined using a Total Sulfur Analyzer (made by Mitsubishi Chemical Corporation (Ltd.)), and the nitrogen content is determined using a Total Nitrogen Analyzer (made by Mitsubishi Chemical Corporation (Ltd.)).

As follows, the present invention is described in greater detail with reference to a series of working examples and comparative examples, although the present invention is in no way limited to the examples presented.

EXAMPLE 1

(1) Hydrolysis and Preparation of the Catalyst 1 liter of water was placed in a 100 liter capacity stainless steel reaction vessel equipped with a stirrer, then warmed to, and maintained at 40° C. Then, 17,500 ml of a magnesium chloride solution with a MgO concentration of 5.0 weight percent prepared by dissolving 4600 g of magnesium chloride in water, and 17,500 ml of a sodium silicate solution with a $SiO_2$ concentration of 9.2 weight percent prepared by adding 1275 g of sodium hydroxide and water to the No. 3 sodium silicate solution, were added dropwise, approximately concurrently, to the reaction vessel, and a silica-magnesia hydrate slurry was obtained. Next, after aging for 30 minutes, the slurry was filtered and washed until a $Na_2O$ concentration of less than 0.2 weight percent was achieved, and yielded a silica-magnesia hydrate gel with a MgO content of 35 weight percent.

Next, in accordance with the co-mixing method, 1865 g of the aforementioned silica-magnesia hydrate gel (360 g of $SiO_2$—MgO), 5.51 g of a platinum tetraammine nitrate solution containing 5.5 weight percent of Pt, and 15.04 g of a palladium tetraammine nitrate solution containing 4.7 weight percent of Pd were plasticized inside a kneader provided with a heating jacket. This plastic substance was subsequently extruded using an extruder, and following drying for 15 hours at a temperature of 110° C., was calcined at 500° C. in an electric furnace for 2 hours to yield a silica magnesia catalyst A with a diameter of 1.4 mm.

The pore characteristics (4 nm or larger) as measured by the mercury porosimetry method, the pore volume (0.7 to 4 nm) and the specific surface area as measured by nitrogen gas adsorption methods, respectively, and the composition of the obtained catalyst A are shown in Table 1. In terms of the nitrogen gas adsorption used, the t-plot method was used to measure the range from 0.7 to 2 nm, and the DH method was used to measure the range from 2 to 4 nm.

(2) Evaluation of the Performance of the Catalyst

Using a fixed-bed flow reactor filled with 15 milliliters of the catalyst A, a straight run light gas oil with properties including a sulfur concentration of 414 ppm, a nitrogen concentration of 37 ppm, total aromatics of 28.6 weight percent, polycyclic aromatics of 2.8 weight percent, and a 90% distillation temperature of 367° C. was processed under reaction conditions including a reaction pressure of 5.0 MPa, a hydrogen/oil ratio of 600 NI/1, a LHSV value of 2.0, and a reaction temperature of 320° C., and the dearomatization rate, and the desulfurization and denitrogenation reaction activity of the processed oil after 100 hours and after 300 hours of reaction were determined. The results obtained are shown in Table 2.

TABLE (1-1)

Active Metal Co-Mixing Method

| Example/Comparative Example | Catalyst No. | Composition (weight %) MgO-SiO₂ | Content of Active noble metal (weight %) Pt/Pd |
|---|---|---|---|
| Example 1 | A | 35-65 | 0.3/0.7 |
| Example 2 | B | 35-65 | 0.3/0.7 |
| Example 3 | C | 25-75 | 0.3/0.7 |
| Example 3 | D | 50-50 | 0.3/0.7 |
| Example 4 | E | 35-65 | 0.15/0.35 |
| Example 4 | F | 35-65 | 0.6/1.4 |
| C-Example 1 | G | 35-65 | 0.3/0.7 |
| C-Example 1 | H | 35-65 | 0.3/0.7 |
| C-Example 2 | I | 35-65 | 0.3/0.7 |
| C-Example 3 | J | 15-85 | 0.3/0.7 |
| C-Example 3 | K | 60-40 | 0.3/0.7 |

(C-Example = Comparative Example)

TABLE 1(1-2)

Catalyst properties

| | Mercury porosimetry | | Nitrogen gas adsorption | | |
|---|---|---|---|---|---|
| | Volume of Pores (ml/g) | | Volume of Pores (ml/g) | | Specific Surface Area |
| | >4 nm | >200 nm | 0.7~2 nm | 2~4 nm | (m²/g) |
| Example 1 | 0.46 | 0.01 | 0.225 | 0.170 | 436 |
| Example 2 | 0.53 | 0.03 | 0.235 | 0.174 | 442 |
| Example 3 | 0.48 | 0.03 | 0.268 | 0.195 | 451 |
| Example 3 | 0.35 | 0.02 | 0.200 | 0.168 | 393 |
| Example 4 | 0.45 | 0.01 | 0.227 | 0.172 | 438 |
| Example 4 | 0.44 | 0.01 | 0.219 | 0.171 | 434 |
| C-Example 1 | 0.22 | 0.01 | 0.066 | 0.078 | 145 |
| C-Example 1 | 0.65 | 0.11 | 0.325 | 0.189 | 470 |
| C-Example 2 | 0.25 | 0.05 | 0.108 | 0.096 | 277 |
| C-Example 3 | 0.52 | 0.04 | 0.276 | 0.193 | 465 |
| C-Example 3 | 0.30 | 0.03 | 0.207 | 0.144 | 360 |

| | Hydrolysis temp. (° C.) | Catalyst Calcination temp. (° C.) |
|---|---|---|
| Example 1 | 40 | 500 |
| Example 2 | 60 | 500 |
| Example 3 | 40 | 500 |
| Example 3 | 40 | 500 |
| Example 4 | 40 | 500 |

TABLE 1(1-2)-continued

| | Catalyst properties | |
|---|---|---|
| Example 4 | 40 | 500 |
| C-Example 1 | 25 | 500 |
| C-Example 1 | 80 | 500 |
| C-Example 2 | 40 | 700 |
| C-Example 3 | 40 | 500 |
| C-Example 3 | 40 | 500 |

TABLE 2

| Example/Compa-rative Example | Catalyst No. | Dearomati-zation Rate (%) 100 h | Dearomati-zation Rate (%) 300 h | Desulfuri-zation Rate (%) 100 h | Desulfuri-zation Rate (%) 300 h | Denitrogen-tation Rate (%) 100 h | Denitrogen-tation Rate (%) 300 h |
|---|---|---|---|---|---|---|---|
| Example 1 | A | 89 | 90 | 75 | 75 | 84 | 83 |
| Example 2 | B | 90 | 90 | 75 | 75 | 83 | 83 |
| Example 3 | C | 76 | 75 | 72 | 72 | 76 | 76 |
| Example 3 | D | 75 | 75 | 71 | 70 | 75 | 75 |
| Example 4 | E | 70 | 70 | 67 | 67 | 72 | 71 |
| Example 4 | F | 93 | 94 | 78 | 78 | 85 | 85 |
| C-Example 1 | G | 24 | 24 | 22 | 22 | 26 | 26 |
| C-Example 1 | H | 70 | 51 | 62 | 48 | 61 | 50 |
| C-Example 2 | I | 36 | 35 | 31 | 33 | 36 | 34 |
| C-Example 3 | J | 53 | 50 | 48 | 46 | 51 | 51 |
| C-Example 3 | K | 58 | 55 | 52 | 52 | 55 | 52 |

EXAMPLE 2

(1) Hydrolysis and Preparation of the Catalyst

A Catalyst B was obtained in the same manner as the Example 1-(1), with the exception that the hydrolysis temperature used to generate the silica-magnesia hydrate was altered to 60° C. The pore characteristics as measured by the mercury porosimetry method, the pore volume and the specific surface area as measured by nitrogen gas adsorption methods, and the composition of the obtained catalyst B are shown in Table 1.

(2) Evaluation of the Performance of the Catalyst

The results of evaluating the catalyst in the same manner as in the Example 1-(2) are shown in Table 2.

EXAMPLE 3

(2) Hydrolysis and Preparation of the Catalysts

Catalysts C and D were obtained in the same manner as the Example 1-(1), with the exception that in the hydrolysis used to generate the silica-magnesia hydrate, the amount of the sodium silicate solution with a $SiO_2$ concentration of 9.2 weight percent added dropwise to the reaction vessel was altered so as to generate 75 weight percent and 50 weight percent of $SiO_2$ respectively. The pore characteristics as measured by the mercury porosimetry method, the pore volume and the specific surface area as measured by nitrogen gas adsorption methods, and the composition of the obtained catalysts C and D are shown in Table 1.

(2) Evaluation of the Performance of the Catalysts

The results of evaluating the catalysts in the same manner as in the Example 1-(2) are shown in Table 2.

EXAMPLE 4

(1) Preparation of the Catalysts

Catalysts E and F were obtained in the same manner as the Example 1-(1), with the exception that in using the silica-magnesia hydrate gel prepared in Example 1-(1), the amount of active metal added was altered to 0.15 weight percent of Pt and 0.35 weight percent of Pd for the catalyst E, and altered to 0.6 weight percent of Pt and 1.40 weight percent of Pd for the catalyst F. The pore characteristics as measured by the mercury porosimetry method, the pore capacity and the specific surface area as measured by nitrogen gas adsorption methods, and the composition of the obtained catalysts E and F are shown in Table 1.

(2) Evaluation of the Performance of the Catalysts

The results of evaluating the catalysts in the same manner as in the Example 1-(2) are shown in Table 2.

Comparative Example 1

(1) Hydrolysis and Preparation of the Catalysts

Catalysts G and H were obtained in the same manner as the Example 1-(1), with the exception that the hydrolysis temperature used to generate the silica-magnesia hydrate was altered to 25° C. and 80° C. respectively. The pore characteristics as measured by the mercury porosimetry method, the pore volume and the specific surface area as measured by nitrogen gas adsorption methods, and the composition of the obtained catalysts G and H are shown in Table 1.

(2) Evaluation of the Performance of the Catalysts

The results of evaluating the catalysts in the same manner as in the Example 1-(2) are shown in Table 2.

Comparative Example 2

(1) Preparing the Catalyst

A catalyst I was obtained by calcining a portion of the extruded and dried product prepared in the Example 1-(1), at 700° C. The pore characteristics as measured by the mercury porosimetry method, the pore volume and the specific surface area as measured by nitrogen gas adsorption methods, and the composition of the obtained catalyst I are shown in Table 1.

(2) Evaluation of the Performance of the Catalyst

The results of evaluating the catalyst in the same manner as in the Example 1-(2) are shown in Table 2.

Comparative Example 3

(1) Hydrolysis and Preparation of the Catalysts

Catalysts J and K were obtained in the same manner as in the Example 1-(1), with the exception that in the hydrolysis used to generate the silica-magnesia hydrate, the amount of the sodium silicate solution with a $SiO_2$ concentration of 9.2 weight percent added dropwise to the reaction vessel was altered so as to generate 85 weight percent and 40 weight percent of $SiO_2$ respectively The pore characteristics as measured by the mercury porosimetry method, the pore volume and the specific surface area as measured by nitrogen gas adsorption methods, and the composition of the obtained catalysts J and K are shown in Table 1.

(2) Evaluation of the Performance of the Catalysts

The results of evaluating the catalysts in the same manner as in the Example 1-(2) are shown in Table 2.

It is clear from Table 1 and Table 2 that the catalysts A, B, C, D, E and F from Example 1 through Example 4 satisfy the requirements of the present invention with regard to the silica-magnesia composition, and the amount of active noble metal, the pore characteristics and the specific surface area of the catalyst, and each shows a high dearomatization activity, high desulfurization activity and denitrogentation activity.

In contrast, although the silica-magnesia composition and the active noble metal content of the catalyst G of the Comparative Example 1 are within the ranges specified in the present invention, the pore characteristics, including the volume of pores with a pore size of at least 4 nm, the volume of pores from 0.7 to 2 nm and the volume of pores from 2 to 4 nm, and the specific surface area of the catalyst G are markedly smaller than the ranges specified in the present invention, and the dearomatization activity, desulfurization activity and denitrogentation activity show a lower value, respectively.

Furthermore, although the silica-magnesia composition and the active noble metal content of the catalyst H of the Comparative Example 1 fall within the ranges specified in the present invention, the catalyst has a high volume of pores with a pore size at least 200 nm, and while the initial dearomatization activity, desulfurization activity and denitrogentation activity are high, the catalyst deactivates quickly, and these activities deteriorate considerably.

Furthermore, although the silica-magnesia composition and the active noble metal content of the catalyst I of the Comparative Example 2 fall within the ranges specified in the present invention, the pore characteristics, including the volume of pores with a pore size of at least 4 nm, the volume of pores from 0.7 to 2 nm and the volume of pores with a pore size from 2 to 4 nm, as well as the specific surface area of the catalyst G are small, and the dearomatization activity, desulfurization activity and denitrogentation activity show a low value, respectively.

In addition, although the active noble metal content and the pore characteristics and specific surface area of the catalysts J and K of the Comparative Example 3 fall within the ranges specified in the present invention, the silica-magnesia composition is outside the range specified in the present invention, and the dearomatization activity, the desulfurization activity and denitrogentation activity show a low value, respectively.

Moreover, the catalysts A, B, C, D, E, F of the present invention maintain high activity even after 300 hours, indicating clearly that the catalytic activity of the catalysts is also stable.

EXAMPLE 5

(1) Hydrolysis and Preparation of the Carrier 25 liters of water was placed in a 100 liter capacity stainless steel reaction vessel equipped with a stirrer, then warmed to, and maintained at 40° C. Then, 17,500 ml of a magnesium chloride solution with a MgO concentration of 5.0 weight percent prepared by dissolving 4600 g of magnesium chloride in water, and 17,500 ml of a sodium silicate solution with a $SiO_2$ concentration of 9.2 weight percent prepared by adding 1275 g of sodium hydroxide and water to the No. 3 sodium silicate solution, were added dropwise, approximately concurrently, to the reaction chamber, and a silica-magnesia hydrate slurry was obtained. Next, after aging for 30 minutes, the slurry was filtered and washed until a $Na_2O$ concentration of less than 0.2 weight percent was achieved, and yielded a silica-magnesia hydrate gel with a MgO content of 35 weight percent.

Next, 1865 g of the aforementioned silica-magnesia hydrate gel (360 g of $SiO_2$—MgO) was plasticized inside a kneader provided with a heating jacket. This plastic substance was subsequently extruded using an extruder, and following drying for 15 hours at a temperature of 110° C., was calcined at 500° C. in an electric furnace for 2 hours to yield a silica magnesia oxide carrier j with a diameter of 1.4 mm.

(2) Preparation of the Catalyst

In accordance with the impregnation method, 5.51g of a platinum tetraammine nitrate solution containing 5.5 weight percent of Pt, and 15.04 g of a palladium tetraammine nitrate solution containing 4.7 weight percent of Pd were mixed together, and an impregnation solution of a specific volume adjusted through the addition of water so as to match the amount of water absorption of the catalyst carrier was impregnated into 100 g of a silica-magnesia oxide carrier j, and after aging, the carrier was dried for 15 hours at 110° C., and subsequently calcined at 500° C. in an electric furnace for 2 hours to yield a catalyst L. The pore characteristics as measured by the mercury porosimetry method, the pore volume and the specific surface area as measured by nitrogen gas adsorption methods, and the composition of the obtained catalyst L are shown in table 3.

(3) Evaluation of the Performance of the Catalyst

Using a fixed-bed flow reactor filled with 15 milliliters of the catalyst L, a straight run light gas oil with properties including a sulfur concentration of 414 ppm, a nitrogen concentration of 37 ppm, total aromatics of 28.6 weight percent, polycyclic aromatics of 2.8 weight percent, and a 90% distillation temperature of 367° C. was processed under reaction conditions including a reaction pressure of 5.0 MPa, a hydrogen/oil ratio of 600 Nl/1, a LHSV value of 2.0 $hr^{-1}$, and a reaction temperature of 320° C., and the dearomatization rate, and the desulfurization activity and denitrogentation activity of the processed oil after 100 hours and after 300 hours of reaction were determined, respectively. The results obtained are shown in Table 4.

EXAMPLE 6

(1) Hydrolysis and Preparation of the Carrier

An oxide carrier k was obtained in the same manner as the Example 5-(1), with the exception that the hydrolysis temperature used to generate the silica-magnesia hydrate was altered to 60° C.

(2) Preparation of the Catalyst

A catalyst M was obtained in the same manner as the Example 5-(2), with the exception that the oxide carrier k obtained in (1) was used. The pore characteristics as measured by the mercury porosimetry method, the pore volume and the specific surface area as measured by nitrogen gas adsorption methods, and the composition of the obtained catalyst M are shown in Table 3.

(3) Evaluation of the Performance of the Catalyst:

The results of evaluating the catalyst in the same manner as in the Example 5-(3) are shown in Table 4.

EXAMPLE 7

(1) Hydrolysis and Preparation of the Carrier

Oxide carriers l and m were obtained in the same manner as the Example 5-(1), with the exception that in the hydrolysis used to generate the silica-magnesia hydrate, the amount of the sodium silicate solution with a $SiO_2$ concentration of 9.2 weight percent added dropwise to the reaction vessel was altered so as to generate 75 weight percent and 50 weight percent of $SiO_2$ respectively.

(2) Preparation of the Catalysts

Catalysts N and O were obtained in the same manner as the Example 5-(2), with the exception that the oxide carriers l and m obtained in (1) were used. The pore characteristics as measured by the mercury porosimetry method, the pore volume and the specific surface area as measured by nitrogen gas adsorption methods, and the composition of the obtained catalysts N and O are shown in Table 3.

(3) Evaluation of the Performance of the Catalyst

The results of evaluating the catalyst in the same manner as in the Example 5-(3) are shown in Table 4.

TABLE 3(3-1)

Active Metal Impregnation Method

| Example/Comparative Example | Catalyst No. | Carrier No. | Composition (weight %) MgO-SiO$_2$ | Content of Active noble metal (weight %) Pt/Pd |
|---|---|---|---|---|
| Example 5 | L | j | 35-65 | 0.3/0.7 |
| Example 6 | M | k | 35-65 | 0.3/0.7 |
| Example 7 | N | l | 25-75 | 0.3/0.7 |
| Example 7 | O | m | 50-50 | 0.3/0.7 |
| Example 8 | P | j | 35-65 | 0.15/0.35 |
| Example 8 | Q | j | 35-65 | 0.6/1.4 |
| C-Example 4 | R | n | 35-65 | 0.3/0.7 |
| C-Example 4 | S | o | 35-65 | 0.3/0.7 |
| C-Example 5 | T | p | 35-65 | 0.3/0.7 |
| C-Example 6 | U | q | 15-85 | 0.3/0.7 |
| C-Example 6 | V | r | 60-40 | 0.3/0.7 |

Catalyst properties

| | Mercury porosimetry | | Nitrogen gas adsorption | | |
|---|---|---|---|---|---|
| | Volume of pores (ml/g) | | Volume of pores (ml/g) | | Specific Surface Area |
| | >4 nm | >200 nm | 0.7~2 nm | 2~4 nm | (m$^2$/g) |
| Example 5 | 0.45 | 0.01 | 0.228 | 0.171 | 439 |
| Example 6 | 0.54 | 0.03 | 0.247 | 0.174 | 446 |
| Example 7 | 0.48 | 0.03 | 0.275 | 0.193 | 453 |
| Example 7 | 0.36 | 0.02 | 0.199 | 0.166 | 395 |
| Example 8 | 0.45 | 0.01 | 0.236 | 0.175 | 440 |
| Example 8 | 0.43 | 0.01 | 0.220 | 0.172 | 436 |
| C-Example 4 | 0.21 | 0.01 | 0.068 | 0.079 | 148 |
| C-Example 4 | 0.64 | 0.11 | 0.317 | 0.187 | 472 |
| C-Example 5 | 0.27 | 0.05 | 0.111 | 0.099 | 281 |
| C-Example 6 | 0.53 | 0.04 | 0.288 | 0.193 | 467 |
| C-Example 6 | 0.30 | 0.03 | 0.198 | 0.145 | 364 |

TABLE 3 (3-2)

| | Hydrolysis temp. (° C.) | Catalyst Calcination temp. (° C.) |
|---|---|---|
| Example 5 | 40 | 500 |
| Example 6 | 60 | 500 |
| Example 7 | 40 | 500 |
| Example 7 | 40 | 500 |
| Example 8 | 40 | 500 |
| Example 8 | 40 | 500 |
| C-Example 4 | 25 | 500 |
| C-Example 4 | 80 | 500 |
| C-Example 5 | 40 | 700 |
| C-Example 6 | 40 | 500 |
| C-Example 6 | 40 | 500 |

TABLE 4

| Example/Comparative Example | Catalyst No. | Dearomatization Rate (%) 100 h | 300 h | Desulfurization Rate (%) 100 h | 300 h | Denitrogentation Rate (%) 100 h | 300 h |
|---|---|---|---|---|---|---|---|
| Example 5 | L | 88 | 90 | 75 | 75 | 83 | 83 |
| Example 6 | M | 90 | 89 | 74 | 75 | 83 | 82 |
| Example 7 | N | 78 | 76 | 71 | 71 | 76 | 76 |
| Example 7 | O | 75 | 75 | 72 | 72 | 75 | 75 |
| Example 8 | P | 70 | 71 | 68 | 68 | 73 | 73 |
| Example 8 | Q | 93 | 93 | 76 | 75 | 85 | 85 |
| C-Example 4 | R | 24 | 24 | 22 | 22 | 26 | 24 |
| C-Example 4 | S | 69 | 52 | 61 | 48 | 64 | 50 |
| C-Example 5 | T | 35 | 35 | 31 | 33 | 36 | 34 |
| C-Example 6 | U | 51 | 50 | 48 | 46 | 51 | 51 |
| C-Example 6 | V | 58 | 55 | 51 | 51 | 54 | 52 |

EXAMPLE 8

Catalysts P and Q were obtained in the same manner as the Example 5-(2), with the exceptions that the oxide carrier j prepared in the Example 5-(1) was used, and the active metal carrier amount was altered to 0.15 weight percent of Pt and 0.35 weight percent of Pd for the catalyst P, and altered to 0.6 weight percent of Pt and 1.40 weight percent of Pd for the catalyst Q. The pore characteristics as measured by the mercury porosimetry method, the pore volume and the specific surface area as measured by nitrogen gas adsorption methods, and the composition of the obtained catalysts P and Q are shown in Table 3. The results of evaluating the performance of the catalysts in the same manner as in the Example 5-(3) are shown in Table 4.

Comparative Example 4

(1) Hydrolysis and Preparation of the Carrier

Oxide carriers n and o were obtained in the same manner as the Example 5-(1), with the exception that the hydrolysis temperatures used to generate the silica-magnesia hydrate were altered to 25° C. and 80° C. respectively.

(2) Preparation of the Catalyst

Catalysts R and S were obtained in the same manner as the Example 5-(2), with the exception that the oxide carriers n and o obtained in (1) were used. The pore characteristics as measured by the mercury porosimetry method, the pore volume and the specific surface area as measured by nitrogen gas adsorption methods, and the composition of the obtained catalysts R and S are shown in Table 3.

(3) Evaluation of the Performance of the Catalysts

The results of evaluating the catalysts in the same manner as in the Example 5-(3) are shown in Table 4.

Comparative Example 5

(1) Preparation of the Carrier

An oxide carrier p was obtained by calcining a portion of the extruded and dried product prepared in the Example 5-(1), at 700° C.

(2) Preparation of the Catalyst

A catalyst T was obtained in the same manner as the Example 5-(2), with the exception that the oxide carrier p obtained in (1) was used. The pore characteristics as measured by the mercury porosimetry method, the pore volume and the specific surface area as measured by nitrogen gas adsorption methods, and the composition of the obtained catalyst T are shown in Table 3.

(3) Evaluation of the Performance of the Catalyst

The results of evaluating the catalyst in the same manner as in the Example 5-(3) are shown in Table 4.

Comparative Example 6

(1) Hydrolysis and Preparation of the Catalyst

Oxide carriers q and r were obtained in the same manner as the Example 5-(1), with the exception that in the hydrolysis used to generate the silica-magnesia hydrate, the amount of the sodium silicate solution with a SiO$_2$ concentration of 9.2 weight percent added dropwise to the reaction vessel was altered so as to generate 85 weight percent and 40 weight percent of $SiO_2$ respectively.

(2) Preparation of the Catalyst

Catalysts U and V were obtained in the same manner as the Example 5-(2), with the exception that the oxide carriers q and r obtained in (1) were used. The pore characteristics as measured by the mercury porosimetry method, the pore volume and the specific surface area as measured by nitrogen gas adsorption methods, and the composition of the obtained catalysts U and V are shown in Table 3.

(3) Evaluation of the Performance of the Catalysts

The results of evaluating the catalysts in the same manner as in the Example 5-(3) are shown in Table 4.

It is clear from Table 3 and Table 4 that the catalysts L, M, N, O, P and Q from Example 5 through Example 8 satisfy the requirements of the present invention with regard to the silica-magnesia composition of the oxide carrier, as well as the pore characteristics, the specific surface area and the amount of active noble metal supported in the catalyst, and show high dearomatization activity, desulfurization activity and denitrogentation activity, respectively.

In contrast, although for the catalyst R of the Comparative Example 4, the silica-magnesia composition of the oxide carrier and the amount of active noble metal supported in the catalyst fall within the ranges specified in the present invention, the pore characteristics of the catalyst, including the pore volume of pores with a pore size of at least 4 nm, the volume of pores with a pore size from 0.7 to 2 nm, and the volume of pores with a pore size from 2 to 4 nm, together with the specific surface area of the catalyst are markedly smaller than the ranges specified, and the dearomatization activity, desulfurization activity and denitrogentation activity show a low value, respectively.

In contrast, for the catalyst S of the Comparative Example 4, although the silica-magnesia composition of the oxide carrier and the amount of active noble metal supported in the catalyst fall within the ranges specified in the present invention, the catalyst has a high pore volume of pores with a pore size of at least 200 nm, and while the initial dearomatization activity, desulfurization activity and denitrogentation activity are high, the catalyst deactivates quickly, and these activities deteriorate considerably.

Furthermore, for the catalyst T of the Comparative Example 5, although the amount of active noble metal supported in the catalyst falls within the range specified in the present invention, the pore characteristics of the catalyst, including the volume of pores with a pore size of at least 4 nm, the pore volume of pores from 0.7 to 2 nm, and the volume of pores from 2 to 4 nm, together with the specific surface area of the catalyst are markedly smaller than the ranges specified, and the dearomatization activity, desulfurization activity and denitrogentation activity show a low value.

Furthermore, for the catalysts U and V of the Comparative Example 6, although the pore characteristics, the specific surface area and the amount of active noble metal supported fall within the ranges required by the present invention, the silica-magnesia composition of the oxide carrier is outside the range specified in the present invention, and dearomatization activity, and desulfurization and denitrogentation activity show a low value.

Moreover, the catalysts L, M, N, O, P and Q of the present invention maintain high activity even after 300 hours, indicating clearly that the catalytic activity of the catalysts is stable.

By employing a configuration described above, a catalyst of the present invention with specific pore characteristics, formed by supporting 0.1 to 2 weight percent, calculated in terms of the metal, of a noble metal from the group VIII of the periodic table, on an oxide carrier comprising a specific silica-magnesia composition, has high dearomatization activity for hydrogenating aromatic hydrocarbons contained in hydrocarbon oils containing sulfur compounds and the like, has superior activity in relation to sulfur compounds and nitrogen hydrocarbons, and moreover can maintain high activity for long periods of time. Accordingly, if a catalyst of the present invention is used in place of conventional catalysts, a light gas oil having a low aromatic content, sulfur content and nitrogen content can be produced.

What is claimed is:

1. A hydrogenation catalyst for hydrocarbon oil containing aromatic hydrocarbons, the catalyst comprising a carrier and an active metal wherein the pore characteristics of the catalyst are such that the volume of pores with a pore size of at least 4 nm as measured by a mercury porosimetry method is within the range from 0.3 to 0.6 ml/g, the volume of pores with a pore size of at least 200 nm as measured by a mercury porosimetry method is no more than 0.05 ml/g, the volume of pores with a pore size from 0.7 to 2 nm as measured by nitrogen adsorption-t-plot method is within the range from 0.2 to 0.3 ml/g, and the volume of pores with a pore size from 2 to 4 nm as measured by nitrogen adsorption-DH method is within the range from 0.15 to 0.2 ml/g.

2. The hydrogenation catalyst of claim 1, wherein the hydrocarbon oil contains a fraction with a boiling point of 170 to 390° C. by an amount of at least 80 weight percent.

3. The hydrogenation catalyst of claim 1, wherein the carrier is formed from silica-magnesia, wherein the active metal is a noble metal selected from the group VIII of the periodic table, and wherein the magnesia content of the silica-magnesia is within a range from 25 to 50 weight percent, calculated in terms of the metal oxide.

4. The hydrogenation catalyst of claim 3, wherein the proportion of the noble metal selected from the group VIII of the periodic table is within a range from 0.1 to 2 weight percent, calculated in terms of the metal.

5. A hydrogenation catalyst for hydrocarbon oil containing aromatic hydrocarbons, the catalyst comprising a carrier and an active metal, wherein the pore size distribution of the catalyst is substantially composed of pore sizes within a range from 4 to 200 nm, and pore sizes within a range from 0.7 to 4 nm, and wherein the volume of pores with a pore size in the range from 4 to 200 nm is 0.3 to 0.6 ml/g, and wherein the volume of pores with a pore size in the range from 0.7 to 4 nm is 0.35 to 0.5 ml/g.

* * * * *